US007603033B1

(12) United States Patent
Lumetta et al.

(10) Patent No.: US 7,603,033 B1
(45) Date of Patent: Oct. 13, 2009

(54) FAULT TOLERANT OPTICAL DATA COMMUNICATION NETWORK

(75) Inventors: Steven Lumetta, Champaign, IL (US); Muriel Medard, Cambridge, MA (US)

(73) Assignee: Netapp, Inc., Sunnyvale, CA (US)

( * ) Notice: Subject to any disclaimer, the term of this patent is extended or adjusted under 35 U.S.C. 154(b) by 369 days.

(21) Appl. No.: 10/186,178

(22) Filed: Jun. 27, 2002

Related U.S. Application Data (60) Provisional application No. 60/301,669, filed on Jun. 28, 2001.

(51) Int. Cl.
*H04B 10/00* (2006.01)

(52) U.S. Cl. ......................................................... 398/5

(58) Field of Classification Search ........................ None
See application file for complete search history.

(56) References Cited

U.S. PATENT DOCUMENTS

| | | | |
|---|---|---|---|
| 5,625,478 A * | 4/1997 | Doerr et al. ..................... | 398/4 |
| 5,680,235 A * | 10/1997 | Johansson ...................... | 398/7 |
| 5,844,906 A | 12/1998 | Khelghatti et al. | |
| 6,392,989 B1 | 5/2002 | Jardetzky et al. | |
| 6,414,768 B1* | 7/2002 | Sakata et al. ................... | 398/59 |
| 6,498,783 B1 | 12/2002 | Lin | |
| 6,625,115 B1 | 9/2003 | Ikeda et al. | |
| 6,639,893 B1 | 10/2003 | Chikenji et al. | |
| 6,657,952 B1* | 12/2003 | Shiragaki et al. ............ | 370/223 |
| 6,704,320 B1 | 3/2004 | Narvaez et al. | |
| 6,721,502 B1* | 4/2004 | Al-Salameh et al. ........... | 398/3 |
| 6,771,907 B1* | 8/2004 | Yamazaki et al. .............. | 398/59 |
| 6,778,781 B2* | 8/2004 | Van Eijk et al. .............. | 398/100 |
| 6,785,288 B1 | 8/2004 | Enns et al. | |
| 6,934,248 B1 | 8/2005 | DeBoer et al. | |
| 7,002,968 B1 | 2/2006 | Tomizawa et al. | |
| 7,027,447 B2 | 4/2006 | Robertson et al. | |
| 7,046,619 B2 | 5/2006 | Alagar et al. | |
| 7,058,007 B1 | 6/2006 | Daruwalla et al. | |
| 7,130,263 B1 | 10/2006 | Ong et al. | |
| 7,133,357 B2 | 11/2006 | Tada et al. | |
| 7,203,201 B2 | 4/2007 | Son et al. | |
| 2002/0003639 A1* | 1/2002 | Arecco et al. ................ | 359/119 |
| 2002/0088003 A1 | 7/2002 | Salee | |
| 2002/0181503 A1 | 12/2002 | Montgomery | |

OTHER PUBLICATIONS

: "A NovelMedium Access Control Protocol for WDM-Based LAN's and Access Networks Using a Master/Slave Scheduler;" Modiano, Eytan and Barry, Richard; 2000 IEEE; Journal of Lightwave Technology, vol. 18, No. 4, Apr. 2000; pp. 461-468.

Muriel Medard, et al., "A Network Management Architecture for Robust Packet Routing in Mesh Optical Access Networks", LEOS SummerTopical Mettings, Jul. 2000, 35 pgs.

U.S. Appl. No. 10/186,178.

* cited by examiner

*Primary Examiner*—Shi K Li
(74) *Attorney, Agent, or Firm*—Perkins Coie LLP (57) ABSTRACT

A fiber-optic networking system that can survive a break in the fiber and restore full connectivity to all nodes in the network. The network can detect the presence of a cut in the fiber, locate the cut, recover from the cut, and restore the communication capacity that was available before the cut. The network is also capable of automatically determining the existence and identity of the nodes in the network, the distance of the node from the headend, and the executing procedures to handle both planned and unplanned (i.e., during a fault) removal of nodes from the network.

26 Claims, 5 Drawing Sheets

FAULT TOLERANT OPTICAL DATA COMMUNICATION NETWORK

CROSS REFERENCE TO RELATED APPLICATIONS

This application claims the benefit of U.S. Provisional Patent Application No. 60/301,669, filed on Jun. 28, 2001, which is incorporated herein by reference.

STATEMENT REGARDING FEDERALLY SPONSORED RESEARCH

Not Applicable.

FIELD OF THE INVENTION

The invention relates generally to communications systems and, more particularly, to fault tolerant networks for the transport of data (computer data, voice, video, or multimedia) over optical fiber.

BACKGROUND OF THE INVENTION

As is known in the art, the level of fault-tolerance and fault-recovery in a communications network depends upon the network topology and transmission format. Conventional optical networks, i.e., networks that use optical fiber as the transmission medium, can be configured using a variety of known topologies, each of which provides varying levels of fault-protection. For example, a network organized in a star topology offers little or no protection against a cut in the fiber from a node to the central unit (often referred to as a "hub"), because a cut totally isolates a node from the rest of the star. So-called ring topologies are popular because all nodes remain connected to each other in the event of a cut in one of the fibers. However, in these designs optical signals need to be received, processed and sometimes modified, and retransmitted at every node in order to detect a fiber cut and wrap traffic around the cut. In the event of a fiber cut, the affected nodes must detect, locate, and recover from the failure, and the other nodes need to participate in the recovery process.

SUMMARY OF THE INVENTION

The present invention provides an optical network that provides fault tolerant data communication. With this arrangement, the network can recover from a cable fault, such as a cut in an optical fiber. While the invention is primarily shown and described in conjunction with a network having a loop topology with a particular redundant fiber cable arrangement, it is understood that the invention is applicable to networks in general in which fault tolerance, recovery and location identification is desirable.

In one aspect of the invention, an optical network includes fault recovery for protecting the network from loss in connectivity in the presence of a cable fault. In one particular embodiment, a cable interconnecting a loop of nodes and a headend includes a primary transmit fiber and a primary receive fiber along with redundant secondary transmit and receive fibers. In an exemplary embodiment, the respective primary and secondary fibers propagate in opposite directions. With this arrangement, nodes downstream of a cable fault can switch to the secondary fibers to maintain connectivity with the other nodes and the headend in the presence of a cable fault.

In another aspect of the invention, a fault tolerant network includes automatic discovery of new (undiscovered) nodes. In one embodiment, a headend sends from time to time a broadcast message for processing by the discovered nodes, i.e., the nodes of which the headend is aware. The discovered nodes reply to the broadcast message, which can include identifications for each of the nodes. The undiscovered nodes also reply to the broadcast message for identification to the headend. The headend can then send a confirmation message to the undiscovered nodes after which the headend can treat this node as a discovered node. The headend can also exchange ranging messages with the undiscovered node to ascertain its location in the network.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
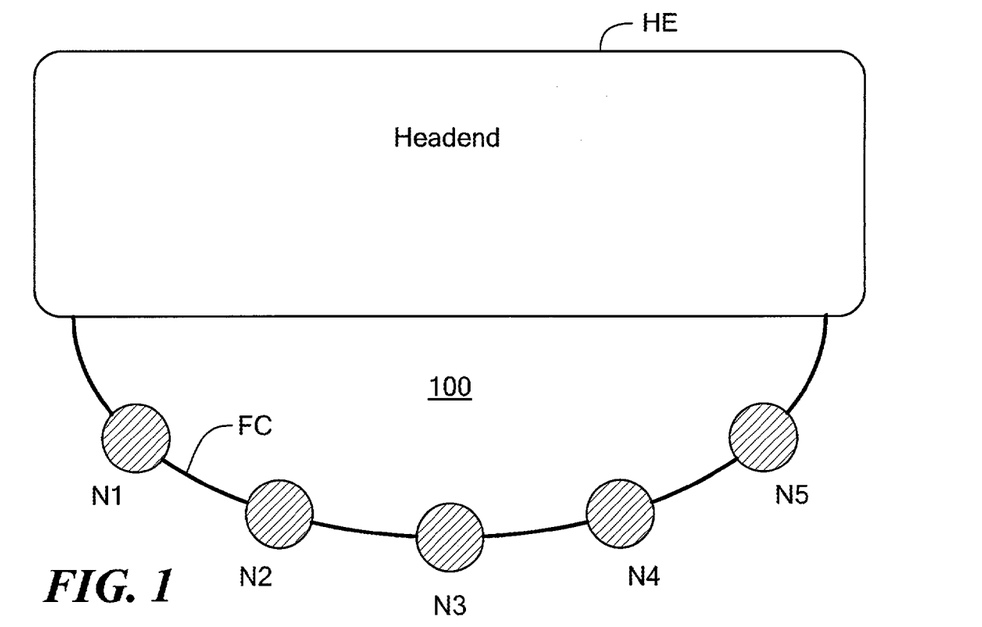
FIG. 1 is a schematic depiction of a fault tolerant optical network in accordance the present invention.

FIG. 1 shows an exemplary optical network 100 having fault tolerant data communication in accordance with the present invention. The network 100 includes a loop of a multifiber cable FC extending serially from a headend HE to each of a plurality of nodes N1-5 in the network. The cable FC can then terminate at the headend HE.

Figure 2:
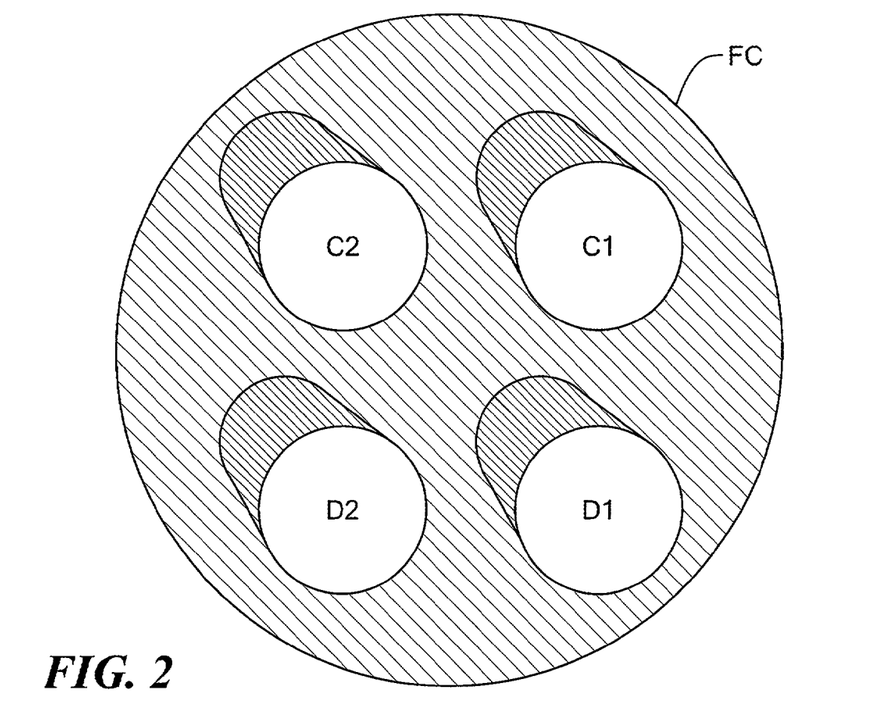
FIG. 2 is a schematic depiction of a multi-fiber optical cable that can be used in the network of FIG. 1.

In an exemplary embodiment shown in FIG. 2, the fiber-cable FC includes four independent optical fibers encased within the same cable. The individual fibers within the cable include a first collection (transmit) fiber C1, a second collection fiber C2, a first distribution (receive) fiber D1, and a second Distribution fiber D2. While the invention is shown and described in conjunction with the illustrated four fiber cable in a loop topology, it is understood that a variety of cable structures and network topologies within the scope of the invention will be readily apparent to one of ordinary skill in the art.

Referring again to FIG. 1, the multifiber cable FC interconnects the nodes in the network in a so-called "daisy chain" arrangement. However, unlike conventional daisy chains, the nodes passively and optically tap each optical fiber C1, D1, C2, D2 in the multifiber cable FC, as described below. The nodes N1-5 include passive optical connections to the fiber-cable loop. That is, the nodes do not repeat or terminate the previous node's transmissions, nor do they perform any processing or modification on the transmissions. Thus, the nodes N1-5 do not perform optical-to-electronic-to-optical (O-to-E-to-O) conversions. One consequence of this passive tapping mechanism is that transmissions from the nodes need to be scheduled (e.g., in a Time Division Multiplexed sense) to prevent collisions on the collection and distribution C1, C2, D1, D2 optical fibers. An exemplary optical network arrangement having passive tapping and scheduled transmission is described in U.S. patent application Ser. No. 09/994,475, filed on Nov. 26, 2001, which is incorporated herein by reference.

This is in contrast to known topologies such as Fiber Distributed Data Interface (FDDI), Distributed Queue Dual Bus, and/or SONET in which each node terminates each segment of a two fiber multifiber cable for converting the incoming optical signal to an electrical signal, processing and potentially modifying the signal, and then reconverting the signal back to an optical signal and retransmitting it to the next node in the sequence.

It is understood that the network system 100 can use wavelength division multiplexing (WDM), in which multiple distinct wavelengths of light are carried simultaneously within the same optical fiber. As is well known to one skilled in the art, WDM creates virtual fibers within one physical fiber, thus there is a duality between physical fibers and WDM channels. This relationship can be used to provide a variety of alternative embodiments to meet the needs of a particular application. In one particular embodiment described herein, a first wavelength is used for transmitting and receiving data from/to the nodes (the "data channel"), and a second wavelength is used for control signaling (the "control channel"). Alternatively, the system can include an additional fiber to carry the control channel, instead of using an additional wavelength.

Figure 3:
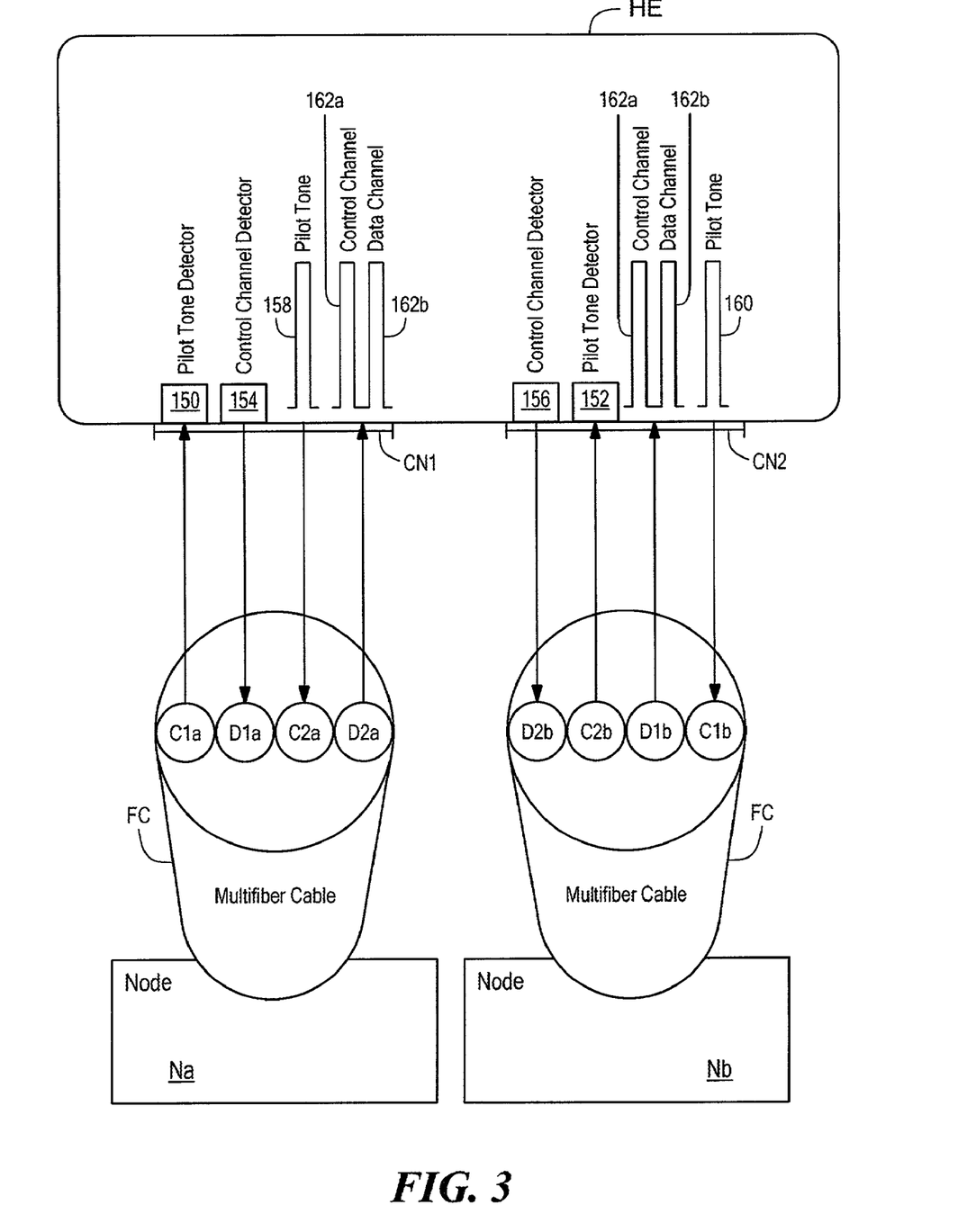
FIG. 3 is a schematic depiction showing further details of the network of FIG. 1.

As shown in FIG. 3, in combination with FIG. 1, collection fibers C1a,b, C2a,b carry data transmitted from the nodes Na, Nb to the headend HE. In the illustrated embodiment, the first collection fiber C1 runs clockwise from the headend HE and the second collection fiber path C2 runs counterclockwise. As described above, nodes transmit on the collection fibers during scheduled times. The distribution fibers D1a,b, D2a,b are used to transmit data and control from the headend HE to the nodes N1-5. The first distribution fiber path D1 runs counterclockwise and the second distribution fiber D2 runs clockwise.

At the endpoint of each optical fiber at the headend HE, there are detectors to determine the presence or absence of the control channels on the Distribution fibers and the pilot tones on the Collection Fibers. In the illustrated embodiment, the headend HE includes a first connector CN1 having ports for each of the four fibers C1a, D1a, C2a, D2a. It is understood that the cable FC extends from the first connector CN1 to a first node Na (not shown). The headend HE also includes a second connector CN2 having ports for each of the four fibers C1b, D1b, C2b, D2b extending to a second node Nb (not shown) in the loop.

In the particular embodiment shown, a first pilot tone detector 150 is coupled to the first collection fiber C1a in the first connector CN1 and a second pilot tone detector 152 is coupled to the second collection fiber C2b in the second connector CN2. A first control channel detector 154 is coupled to the first distribution fiber D1a in the first connector CN1 and a second control channel detector 156 is coupled to the second distribution fiber D2b in the second connector CN2. A first pilot tone generator 158 is coupled to the second collection fiber C2a in the first connector CN1 and a second pilot tone generator 160 is coupled to the first collection fiber C1b in the second connector CN2. And as described above, a control channel 162a and a data channel 162b are received by the second distribution fiber D2a of the first connector CN1 and by the first distribution fiber D1b of the second connector.

In general, the distribution fibers D1, D2 also carry control messages from the headend HE to the nodes on a wavelength (the "control channel") that is separate from the data wavelength (the "data channel"). Again, a separate fiber could be used instead of a separate wavelength. The headend HE sends the control messages on both D1 and D2, and sends a control signal (a "pilot tone") on C1 and C2 over the control channel. These signals are used to determine if a fiber-cut has occurred, and can be ignored by the nodes.

For example, the headend HE sends a pilot tone over the control channel on the first collection fiber C1b in the second connector CN2. If the headend HE pilot tone detector 150 in the first connector CN1, which is at the other end of the fiber, does not receive this signal then it can be deduced that the optical fiber has been cut.

Figure 4:
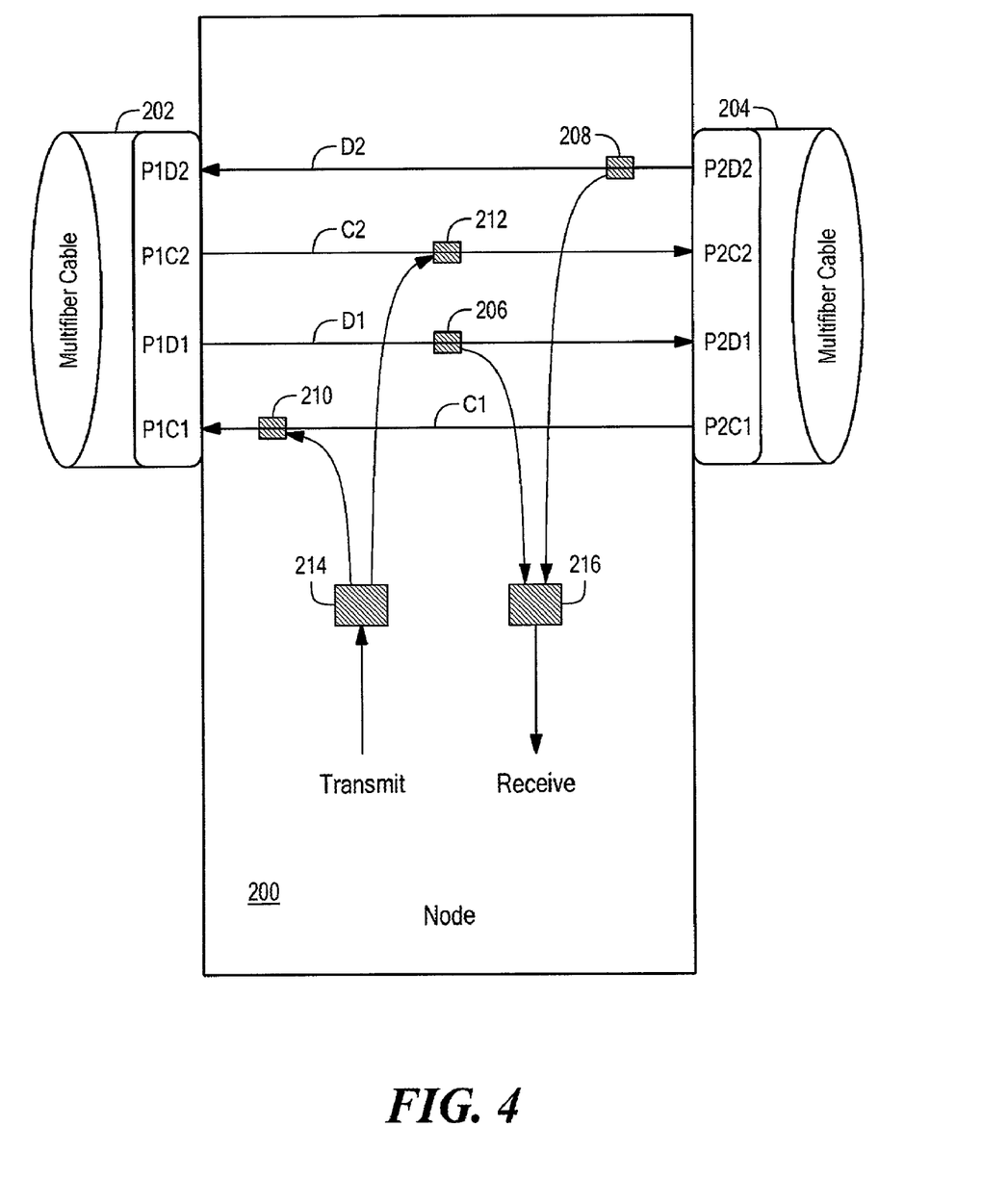
FIG. 4 is a schematic depiction showing further details of fault tolerant operation in the network of FIG. 1.

FIG. 4 shows an exemplary node 200 input/output connection in accordance with the presence invention. In one embodiment, a network interface card (NIC) can include the illustrated connections. The node 200 includes a first connector 202 having respective ports P1C1, P1D1, P1C2, P1C2 for each of the first collection fiber C1, the first distribution fiber D1, the second collection fiber C2, and the second distribution fiber D2. The node 200 also includes a second connector 204 having respective ports P2C1, P2D1, P2C2, P2D2 for the collection and distribution fibers C1, D1, C2, D2. In the illustrated embodiment, the node 200 provides a fiber connection from the first port connector 202 to the second connector 204 for each of the fibers.

The node 200 includes a first passive optical tap 206 on the first distribution fiber D1 and a second passive optical tap 208 on the second distribution fiber D2. The node 200 further includes a first passive optical coupler 210 on the first collection fiber C1 and a second passive optical coupler 212 on the second collection fiber C2. A transmit optical switch 214 is coupled to the first and second optical couplers 210,212 and a receive optical switch 216 is coupled to the first and second optical taps 206,208. As described above, the node 200 transmits on the collection fiber C1 (or C2) and receives on the distribution fiber D1 (or D2).

Referring to FIG. 4 in combination with FIG. 1, in normal operation, the first collection fiber C1 collects transmissions from the nodes N1-5 (FIG. 1) and directs them to the headend HE, with the second collection fiber C2 serving as a standby fiber that is used if the fiber-cable is cut or otherwise faulty. The headend HE receives data from the nodes N1-5 on the first collection fiber C1 and distributes the data back to the nodes on the first distribution fiber D1, with the second distribution fiber D2 serving as a standby fiber in the event of a fiber cut. Nodes "speak" on the Collection fibers C1, C2, and "listen" on the Distribution fibers D1, D2. Note that in the illustrated embodiment, the transmitting node's message must pass through the headend HE before being heard by the receiving node, even if the receiving node is downstream of the transmitting node on the Collection fiber C1, again because nodes do not listen on the Collection fibers.

It is understood that the directions of the fibers can be changed, so long as the primary and secondary collection fibers C1, C2 propagate in opposite directions around the loop, and similarly with the distribution fibers D1, D2. With modifications that will be readily apparent to one of ordinary skill in the art, the network can allow downstream nodes to listen to the Collection fiber instead of the Distribution fiber. For example, such an arrangement can be used for optimization in multi-loop configuration, as described below.

During normal operations, the headend HE sends control messages over the control channel on D1 to all the nodes. These messages are, in effect, permissions for the nodes to transmit to a particular node (or set of nodes in the case of a "multicast" transmission) for a duration specified in the message. All nodes listen to the control channel on the first distribution fiber D1 with each node ignoring those control messages that are not addressed to that node. That is, in general a node only takes action on those control messages that are addressed to it. When a node receives a control message addressed to it, that node then transmits data on the first collection fiber C1, to the node indicated in the permission for the specified duration. The headend HE receives this transmission and then distributes it to the nodes using the distribution fibers D1, D2. The nodes listen on D1, ignoring those messages not intended for it. In the illustrated embodiment, the second distribution fiber D2 is a standby optical fiber for the first distribution fiber D1, and is ignored during normal operations.

Figure 5:
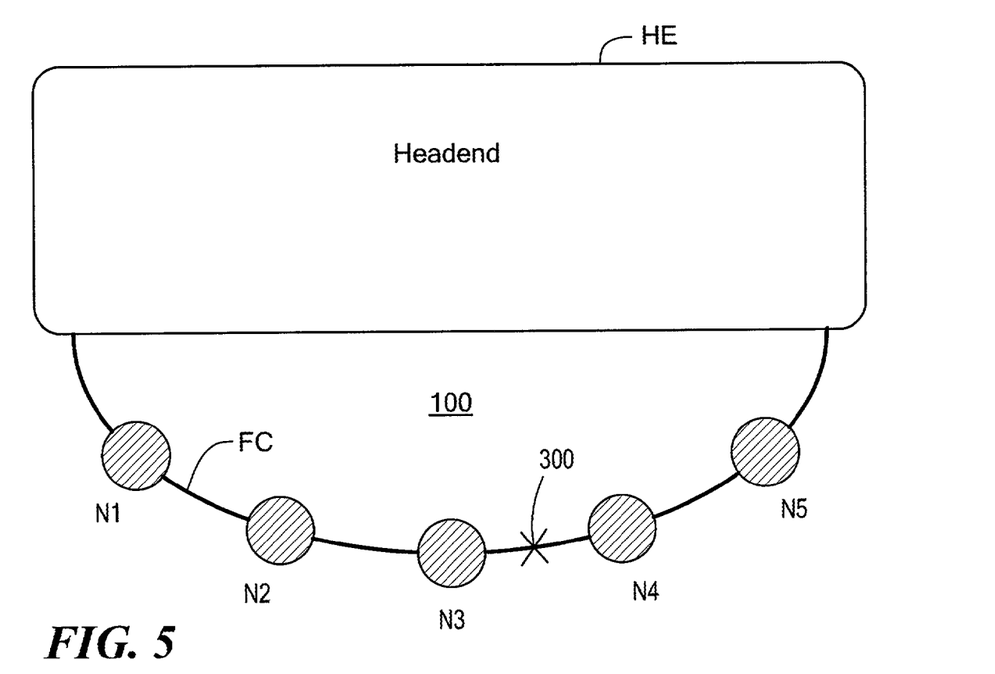
FIG. 5 is a block diagram of a fault tolerant optical network in accordance with the present invention having a fiber cut.

Referring now to FIG. 5, which is similar to FIG. 1 with the addition of a fiber cut 300, in combination with FIG. 3, another aspect of the invention is shown in which the network 200 includes fiber cable cut localization and recovery. To illustrate cable cut localization and recovery in accordance with the present invention, consider the case where the cable FC has been completely cut in a given location 300 and all individual optical fibers C1, D1, C2, D2 in the cable FC are severed at that point. When this occurs, the pilot tone on C1$a$ of the first connector CN1 will not be received at the headend HE, thus indicating the presence of the cut. Upon detecting the fiber-cable cut 300, the headend HE immediately stops sending permissions to the nodes. The headend HE sends instead control messages indicating a fault condition, such as an "alarm message."

During normal operation of the network, nodes N1-5 receive a continuous stream of control messages from the headend HE on the first distribution fiber D1. Due to the fiber-cable cut 300, nodes downstream of the cut, i.e., nodes N4, N5, no longer receive the stream of control messages. In response, these nodes N4, N5 switch over to the second distribution fiber D2 to obtain control messages. These nodes N4, N5 can then also transmit on the secondary collection fiber C2 with permission. Once the nodes downstream of the cut N4, N5 switch to D2, all nodes in the system receive the control messages being sent by the headend HE indicating the presence of the fault. At this point, the headend HE and all the nodes are aware of the fault, and all nodes know which side of the cable-cut 300 they are located, indicated by the Distribution fiber (D1 or D2) from which the node is receiving control messages.

The headend HE then determines the exact location of the cut 300. To do this, the headend HE sends each node a message asking it which side of the cut it is on, e.g., which Distribution fiber (D1 or D2) the node is listening to. Upon receiving responses from all nodes N1-5, the headend HE can determine the location of the cut. That is, the headend HE determines which pair of nodes surrounds the cut. In the illustrated embodiment, the cut 300 is between the third and fourth nodes N3, N4.

The scenario described above assumes that all optical fibers in the cable are cut at the same place. It is understood, however, that it is possible for a subset of the four fibers to be cut, thus resulting in sixteen different combinations of optical fiber cuts. In addition, one of ordinary skill in the art will appreciate that it is possible to optimize the localization and recovery procedure for each particular combination. Alternatively, for the sake of consistency and ease of implementation, a general localization and recovery procedure can be designed that can be used for any fault configuration.

Still referring to FIGS. 3 and 5, in a generalized procedure for fiber cut localization, since there is a detector at the endpoint of every optical fiber C1$a,b$, D1$a,b$, C2$a,b$, D2$a,b$ in the multifiber cable, as shown and described above, the headend HE can sense the presence of a cut in any of the fibers, but may not know exactly where the cut is located. Upon detecting any cut, the headend HE immediately ceases to send out further permissions to the nodes, and sends a continuous stream of "alarm" messages on the control channels on the first and second distribution fibers D1, D2 to alert the nodes of the presence of the fault. If a node does not receive the control channel on D1, it switches over to D2. The nodes make note of which Distribution fiber is still functional, such as by setting appropriate status registers present at the node.

Next, the headend HE commands all nodes N1-5 to determine if they can obtain the control channel on D2. The headend HE sends a control message instructing all nodes to listen to D2 to test for the presence of the control channel. A node that is already listening on D2 for the control channel can ignore this step, as the node already knows the state of D2. Nodes listening to D1 for the control channel temporarily listen for the control channel on D2, and make note of the presence or absence of the control channel, and then return to listening to D1.

The headend HE next sends individual commands to each node instructing it to send a test message to itself on C1. If the node receives the test message (on the functional Distribution fiber), then C1 is functional for that node, and the node makes note of this fact. The analogous process is used to determine the state of the C2 fiber. At this point, each node knows the state of each of the four fibers.

Finally, the headend HE commands each node to inform the headend of the status of its fibers. This information is used by the headend to precisely identify and locate the fault, and to inform network management software and administrative personnel.

In another aspect of the invention, an optical network includes automatic node discovery and ranging. With this arrangement, new nodes can be discovered and located automatically.

Figure 6:
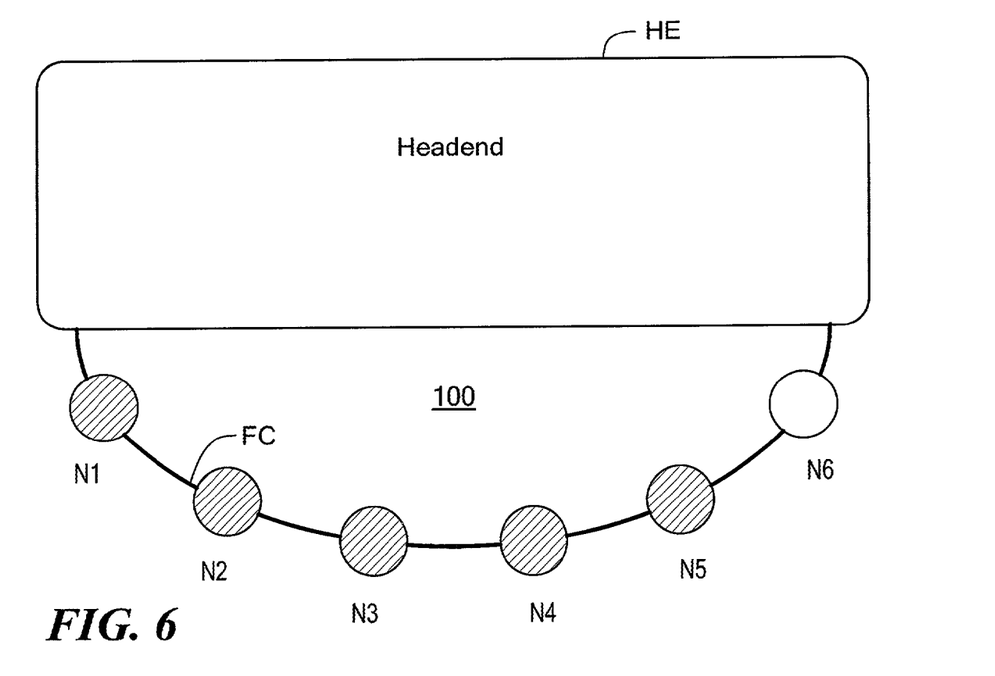
FIG. 6 is a schematic depiction showing a fault tolerant network having node auto discovery in accordance with the present invention.

Referring now to FIG. 6, which is similar to FIG. 1 with the addition of a new (undiscovered) node N6, node auto discovery in accordance with the present invention is described. In an exemplary embodiment, the headed HE sends a "discovery" control message over the control channel from time to time. This message is addressed to a broadcast address so that every node N1-6 will process it, and will contain a list of node identification numbers. It is understood that all nodes N1-5 of which the headend is aware, have a globally unique identification number, which can be similar to the 48-bit addresses used in Ethernet networks. If a node's identification number is not in the list, e.g. N6, the undiscovered node N6 will send a "hello" packet informing the headend HE of the node's existence and address. In an exemplary embodiment, the new node N6 must be discovered before the headend HE will permit this node N6 to communicate with other nodes N1-5.

However, the new node N6 cannot send a transmission without a permission message from the headend HE. And since the headend HE is not aware of the undiscovered node, the headend HE will not send the undiscovered node a permission message, resulting in a deadlock situation. In one particular embodiment, the deadlock is resolved when, after sending out the initial "discovery" control message, the headend HE waits an amount of time for the nodes N1-5 to process the message and prepare a "hello" response, and then sends a broadcast message commanding the undiscovered nodes N6 to transmit their "hello" control messages. If there is only one undiscovered node, e.g., N6, its message will be sent to the headend HE, and the headend will send confirmation of the discovery in a later control message.

If there is more than one undiscovered node, a collision could result because multiple nodes will send their "hello" response messages simultaneously. A collision results in an invalid message, e.g., the resulting frame check sequence will indicate an error, and the headend will reject the response. The nodes will realize that a collision has occurred because they will not receive confirmation of their presence from the headend. After not receiving a confirmation message after a fixed amount of time, the nodes will wait a random amount of time before attempting to resend the "hello" message. In particular, each node will wait for a random number of transmission opportunities (permissions from the headend) to pass, and then attempt retransmission at the next permission. This process will continue for every undiscovered node until every node receives a confirmation from the headend.

In addition to knowledge of the existence of a node e.g., N6, the distance of the node from the headend HE may be needed. The process of measuring this distance automatically is known as "ranging." The headend HE initiates this process by sending a "ranging command" control message over the control channel (on D1, during normal operation) to the node N6. The node N6 then sends a message addressed to itself over C1, and listens for it on D1, measuring the time it takes to return. Dividing this elapsed time by two reveals the downstream delay from the node N6 to the headend HE. For precision, the propagation time through the headend HE, which is a fixed and known quantity, needs to be subtracted from the round-trip delay. A similar procedure is used to determine the delay from the headend HE to the node N6 in the other direction: the node N6 sends a message to the headend on C2, and listens for it on D2. Subtracting the propagation delay through the headend, and then dividing by two reveals the time-delay from headend to the node. The headend HE then sends a control message to the node N6, requesting the findings of the ranging measurements.

In a further aspect of the invention, nodes can be inserted and removed from the network with minimal disruption. Inserting a node in the network entails temporarily breaking the loop. In order to minimally disrupt network operations during the addition of the new node, the headend HE can be informed that the loop is going to be intentionally cut. The headend HE then instructs the nodes to use the Collection and Distribution fibers that permit network operations during the planned cut. After this has been done, a new node may be inserted into the loop at the location specified to the network management software, and the headend HE will ignore fiber-cable cut alarms, as it is expecting this to happen. With the new node in place and the fiber-cable reconnected, the headend HE begins the automatic discovery to learn the identity of the new node, followed by a ranging measurement to determine its position.

Another way to add a node, e.g., N6, is to simply insert it into the loop without informing the headend HE. The headend HE treats the breaking of the loop as a fault, and performs the fiber-cut recovery procedure. When the loop has been restored (with the new node in place), the headend HE conducts the automatic discovery and ranging procedures. The consequence of not informing the headend HE prior to adding a new node is that network operations are disrupted resulting in lost traffic. While the network eventually recovers, it can do so much more gracefully without the loss of any traffic if the headend HE is informed in advance that a new node is about to be added.

Removing a node from the network entails breaking the loop, and the headend HE commences recovery procedures until the loop is restored. As in the last case, the system can more gracefully remove a node if it is informed prior to doing so.

A node that fails (for example, because of a power failure) presents little problem: since the node's connection to the network is passive, the network is not dependent on that node (as it is in daisy-chained networks such as FDDI). The headend periodically asks for feedback messages from the nodes. A headend will assume that a node that has not responded to feedback requests is not functioning, and will eventually stop granting it permissions. If the node restarts at some later time, the headend will detect it during one of the periodic automatic discovery procedures.

Figure 7:
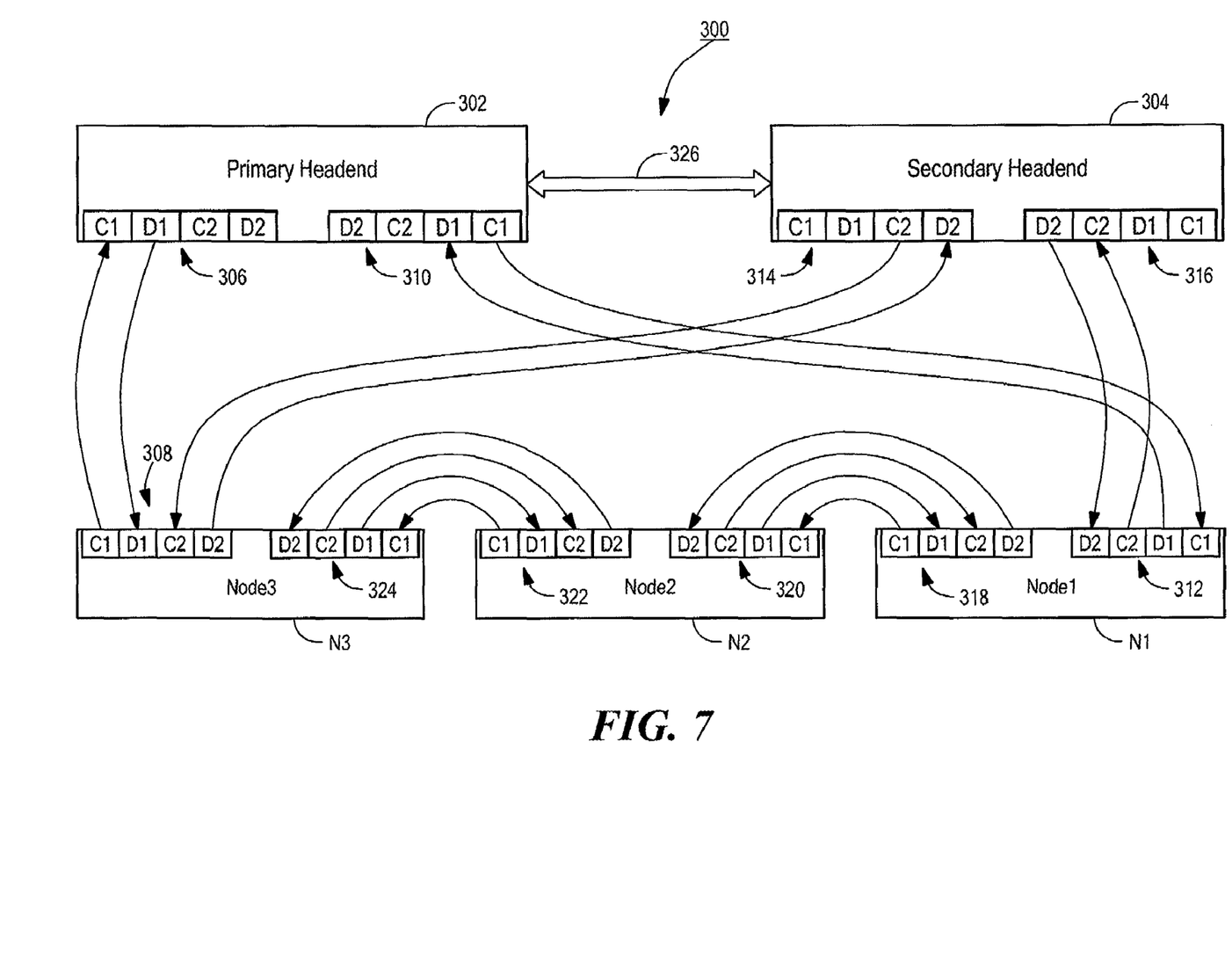
FIG. 7 is a schematic representation of a fault tolerant network having primary and second headends in accordance with the present invention.

In another aspect of the invention shown in FIG. 7, a network 300 includes a headend failover configuration having a primary headend 302 and a secondary headend 304. The secondary headend 304 can automatically assume system control operations in the event that the primary headend 302 suffers component failure, power outage, or other hardware or software damage.

In general, the fibers are connected such that the primary headend 302 uses only the primary collection and distribution fibers C1, D1 to connect to the nodes N1-3, while the secondary headend uses the C2 and D2 pair. More particularly, the primary headend 302 includes a first connector 306 coupled to a first connector 308 of the third node N3 so as to connect the first collection and distribution fibers C1, D1. A second connector 310 of the primary headend 302 connects the first collection and distribution fibers C1, D1 to a second connector 312 of the first node N1. A first connector 314 of the secondary headend 304 connects the second collection and distribution fibers C2, D2 to the first connector 308 of the third node N3 and second connector 316 connects the second collection and distribution fibers C2, D2 to the second connector 312 of the first node N1. A first connector 318 of the first node N1 connects a cable C1, D1, C2, D2 to a second connector 320 of the second node N2 and a first connector 322 of the second node N2 connects to a second connector 324 of the third node N3. The primary and secondary headends 302, 304 communicate via a connection 326.

During normal network operation, the secondary headend 304 remains idle, waiting for messages from the nodes informing it that the primary headend 302 has failed and monitoring status updates from the primary headend on the inter-headend connection 326. If one headend fails, the other assumes control, and nodes remain fully connected. If the cable between two nodes is cut, the nodes are separated into two segments. The primary headend 302 services the nodes on one side of the cut (one segment), while the secondary headend 304 services the other side (the other segment). The connection 326 between the headends is used to provide connectivity between the two segments.

Both headends 302, 304, in coordination with each other, need to independently perform the automatic discovery and ranging procedures on all the nodes. During a loop cut, the headends 302, 304 conduct communication from one segment to the other via the connection between the headends. As in the single headend configuration described above, each headend monitors the endpoints of its Collection and Distribution fiber for the control channel and pilot tone. The loss of these signals indicates a fault.

If a node detects that the primary headend 302 is suffering from a failure, the node switches to the secondary headend 304 by switching to C2 and D2, and informs the secondary headend 304 of the switch. Through a process of elimination in which all the alarms and error messages are correlated, the nodes and the headend can determine the nature and location of the failure, and restore full connectivity using the procedures very similar to the ones described for the single-headend case.

While the embodiments shown and described above have a single loop, one of ordinary skill in the art will readily recognize that to scale the network to support many nodes, a system can use multiple loops, and use an optical, electronic, or opto-electronic switching subsystem, located in the headend, so that data traffic from one loop can be shunted to another loop. When the switching subsystem is not enabled, all the loops operate independently; the traffic in one loop is isolated from another loop. With the switching system enabled, loops can exchange traffic with one other loop, a subset of other loops (multicast), or to all loops (broadcast), depending on the connections permitted by the switching subsystem. For example, if the switching subsystem is an electronic crosspoint switch, singlecast, multicast, and broadcasts can be supported. Similarly, a switching subsystem composed of a matrix of micro-mechanical optical switches can support one loop to another.

Further fault tolerant features are shown and described in U.S. patent application Ser. No. 10/186,303, entitled "Multiple Switch Protected Architecture" filed on even date herewith, the disclosure of which is incorporated herein by reference.

While loop topology is utilized for the embodiment detailed here, it will be readily apparent to one of ordinary skill in the art that the techniques described above are applicable to a variety of topologies including rings, trees of rings, general mesh networks, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for protecting an optical network from connectivity loss in the presence of a cable fault, comprising:
  interconnecting a plurality of nodes and a headend via cables having secondary collection and distribution fibers that propagate data in opposite directions from respective primary collection and distribution fibers to maintain connectivity to the headend in the presence of a cable fault, wherein each of the plurality of nodes is optically connected to both the primary and the secondary collection and distribution fibers; and
  in response to the cable fault, causing a first node of the plurality of nodes to switch from transmitting data on the primary collection fiber to transmitting data on the secondary collection fiber, if the first node no longer receives signals, sent from the headend, on the primary collection fiber.

2. The method according to claim 1, further including passively tapping traffic on the primary and secondary distribution fibers.

3. The method according to claim 1, further including passively coupling traffic on the primary and secondary collection fibers.

4. The method according to claim 1, further including determining the location of the cable fault by determining which of the plurality of nodes require use of the secondary collection and/or distribution fiber to maintain connectivity with the headend.

5. The method according to claim 1, further including generating a pilot tone by the headend for transmission on the primary collection fiber.

6. The method according to claim 1, further including generating a control channel by the headend for transmission on the primary distribution fiber.

7. The method according to claim 1, further including generating a pilot tone by the headend for transmission on the secondary collection fiber.

8. The method according to claim 1, further including passively optically tapping the primary distribution fiber.

9. The method according to claim 1, further including passively optically coupling the primary collection fiber.

10. The method according to claim 1, further including causing a second node of the plurality of nodes to switch from receiving data on the primary distribution fiber to receiving data on the secondary distribution fiber, if the second node no longer receives control messages, generated by the headend, on the primary distribution fiber.

11. The method according to claim 10, further including determining a location of the cable fault based upon which ones of the plurality of nodes receive control messages on the primary distribution fiber and which ones of the plurality of nodes receive control messages on the secondary distribution fiber.

12. The method according to claim 1, wherein the signals comprise pilot tones generated by the headend.

13. The method according to claim 1, further including sending alarm messages by the headend after detection of the cable fault.

14. The method according to claim 1, further including transmitting by the headend a first message to the plurality of nodes instructing the nodes to listen on the secondary distribution fiber for a second message.

15. The method according to claim 1, further including transmitting by the headend of a first message instructing each of the plurality of nodes to transmit a second message to itself.

16. The method according to claim 15, further including determining whether each of the nodes received the second message sent to itself.

17. The method according to claim 1, further including connecting a secondary headend to the headend such that the network can operate if the headend fails.

18. A method of fault tolerant operation of an optical network, comprising:
  providing a primary transmit optical path using a primary transmit fiber between a headend and first and second nodes connected in a loop for enabling the first and second nodes and the headend to transmit data in the loop, the primary transmit optical path having a first direction;
  providing a primary receive optical path using a primary receive fiber between the headend and the first and second nodes for receiving data in the loop, the primary receive optical path having a second direction;
  providing a secondary transmit optical path using a secondary transmit fiber between the headend and the first and second nodes, the secondary transmit optical path having the second direction;
  providing a secondary receive optical path using a secondary receive fiber between the headend and the first and second nodes, the secondary receive optical path having the first direction;
   wherein, the first and second nodes are optically connected to both the primary and the secondary transmit and receive fibers;

in response to a break in the loop between the first and second nodes, causing the first node to switch from transmitting data on the primary transmit optical path to transmitting data on the secondary transmit optical path, if the first node no longer receives signals, sent from the headend, on the primary optical path; and identifying a the break in the loop between the first and second nodes by monitoring traffic on the primary transmit optical path and the primary receive optical path.

19. The method according to claim 18, further including identifying the break in the loop by monitoring traffic on the secondary transmit optical path and the secondary receive optical path.

20. The method according to claim 18, further including switching by the first node from receiving data on the primary receive optical path to receiving data on the secondary receive optical path.

21. A fault tolerant network, comprising:

a primary headend;

a secondary headend coupled to the primary headend via a communication channel; and a plurality of nodes interconnected to the primary and secondary headends via a cable having a primary collection fiber, a primary distribution fiber, a secondary collection fiber, and a secondary distribution fiber, wherein the primary and secondary collection fibers propagate data in opposite directions and the primary and secondary distribution fibers propagate data in opposite directions so as to maintain connectivity in the presence of a cable fault and/or failure of a first one of the primary and secondary headends, wherein each of the plurality of nodes is optically connected to the primary and the secondary distribution and collection fibers.

22. The network according to claim 21, wherein the primary headend includes a first connector and a second connector and the secondary headend includes a first connector and second connector.

23. The network according to claim 22, wherein the first connector of the primary headend connects the primary collection fiber in a direction to the primary headend from a first node of the plurality of nodes.

24. The network according to claim 23, wherein the second connector of the primary headend connects the primary collection fiber in a direction from the primary headend to a second node of the plurality of nodes.

25. The network according to claim 23, wherein the first connector of the secondary headend connects the secondary distribution fiber in a direction from a first node of the plurality of nodes to the secondary headend.

26. The network according to claim 25, wherein the second connector of the second headend connects the secondary distribution fiber in a direction from the secondary headend to a second node of the plurality of nodes.

* * * * *

UNITED STATES PATENT AND TRADEMARK OFFICE
CERTIFICATE OF CORRECTION

PATENT NO. : 7,603,033 B1  Page 1 of 1
APPLICATION NO. : 10/186178
DATED : October 13, 2009
INVENTOR(S) : Lumetta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

Signed and Sealed this

Fifth Day of October, 2010

David J. Kappos
*Director of the United States Patent and Trademark Office*